US012104769B1

(12) United States Patent
Wu et al.

(10) Patent No.: US 12,104,769 B1
(45) Date of Patent: Oct. 1, 2024

(54) FLOODLIGHT

(71) Applicant: Shenzhen Huadian Lighting Co., Ltd., Shenzhen (CN)

(72) Inventors: Dongwei Wu, Shenzhen (CN); Huadong Wu, Shenzhen (CN); Wei Kang, Shenzhen (CN); Yuegui Li, Shenzhen (CN); Jide Zhang, Shenzhen (CN)

(73) Assignee: Shenzhen Huadian Lighting Co., Ltd., Shenzhen (CN)

( * ) Notice: Subject to any disclaimer, the term of this patent is extended or adjusted under 35 U.S.C. 154(b) by 0 days.

(21) Appl. No.: 18/651,114

(22) Filed: Apr. 30, 2024

(51) Int. Cl.

| | |
|---|---|
| ***F21V 17/10*** | (2006.01) |
| ***F21V 5/04*** | (2006.01) |
| ***F21V 17/12*** | (2006.01) |
| ***F21V 17/16*** | (2006.01) |
| ***F21V 29/504*** | (2015.01) |
| ***F21Y 105/16*** | (2016.01) |
| ***F21Y 115/10*** | (2016.01) |

(52) U.S. Cl.
CPC .............. *F21V 17/107* (2013.01); *F21V 5/04* (2013.01); *F21V 17/12* (2013.01); *F21V 17/164* (2013.01); *F21V 29/504* (2015.01); *F21Y 2105/16* (2016.08); *F21Y 2115/10* (2016.08)

(58) Field of Classification Search
CPC ........ F21V 17/107; F21V 5/04; F21V 17/164; F21V 29/504; F21Y 2105/16; F21Y 2115/10; F21S 8/003; F21S 8/032
See application file for complete search history.

(56) References Cited

U.S. PATENT DOCUMENTS

| | | | | |
|---|---|---|---|---|
| 11,519,573 | B1 * | 12/2022 | Ma | F21V 31/005 |
| 2012/0300456 | A1 * | 11/2012 | Phillips, III | F21V 5/04 362/245 |
| 2013/0088871 | A1 * | 4/2013 | Yun | F21V 29/74 362/373 |

* cited by examiner

*Primary Examiner* — Peggy A Neils
(74) *Attorney, Agent, or Firm* — Hawaii Patent Services; Nathaniel K. Fedde; Kenton N. Fedde

(57) ABSTRACT

A floodlight, comprising a lamp board, a lens, a radiator and a frame; wherein the lamp board has a light emitting side and a backlight side, and at least one mounting hole is provided on the lamp board; the lens is arranged on the light emitting side, and the lens has a near light side portion close to the lamp board, and at least one first connector is provided on the near light side portion corresponding to a position where the at least one mounting hole is provided; the radiator is arranged on the backlight side, and at least one second connector are arranged on the radiator corresponding to the position where the at least one mounting hole is provided; and one of the first connectors and the at least one second connector can pass through the at least one mounting hole and be detachably connected with the other.

18 Claims, 15 Drawing Sheets

FLOODLIGHT

TECHNICAL FIELD

The present invention relates to the technical field of floodlights, in particular to a floodlight.

BACKGROUND TECHNOLOGY

Floodlight is common lighting equipment, which is usually used for outdoor landscape lighting or indoor large-area lighting. The floodlight is designed to distribute light evenly to target areas through optical devices on the floodlight, such as a lens or a reflector, so as to achieve a wide range of lighting effects. Floodlight is characterized by being able to generate a wide range of light and covering a wide area, and is often used to brighten buildings, landscapes or squares, and create a bright and comfortable atmosphere for the environment.

However, there are some problems in use of floodlights on the market at present. Due to the high temperature of the internal light source, air pressure inside the lens increases, consequently, the lens made of polycarbonate softens in the high temperature environment, and the light-emitting surface of the lens protrudes outward. In order to solve the problem above, in the prior art, the lens is often fixed by screwing the front of the lens. However, this operation requires opening holes in the lens and adding additional waterproof gaskets to ensure waterproof performance, which not only increases production and testing procedures, but also affects appearance of the product. Therefore it remains a difficult problem to balance between fixing the lens and maintaining the beautiful appearance of the product in the use of floodlights on the market.

SUMMARY OF THE INVENTION

A main purpose of the present invention is to provide a floodlight, aiming at solving the technical problem that there are too many production and testing procedures of the floodlight in the prior art.

In order to achieve the above purpose, the floodlight provided by the present invention comprises a lamp board, a lens, a radiator and a frame;

- the lamp board has a light emitting side and a backlight side, and at least one mounting hole is provided on the lamp board;
- the lens is arranged on the light emitting side, and the lens has a near light side portion close to the lamp board, and at least one first connector is provided on the near light side portion corresponding to position where the at least one mounting hole is provided;
- the radiator is arranged on the backlight side, and at least one second connector are arranged on the radiator corresponding to the position where the at least one mounting hole is provided; and one of the first connectors and the at least one second connector can pass through the at least one mounting hole and be detachably connected with the other; and
- the frame is rotatably arranged on the radiator, and can rotate relative to the radiator, and can be rotated to a fixed position and a dismounting position; when the frame is in the fixed position, the frame abuts against the lens, so as to the lens moves in a direction close to the radiator; and when the frame is in the dismounting position, the frame is separated from the lens to avoid the lens being detached from the radiator.

In one possible solution, the lamp board comprises a plate body and a plurality of light emitting parts arranged on the plate body, and at least one mounting hole is arranged on the plate body;

- a plurality of light guiding parts are provided on the near light side portion corresponding to the plurality of light emitting parts one by one; and
- height of the at least one first connector protruding from a surface of the near light side portion is greater than height of the light guiding parts protruding from the surface of the near light side portion; and the at least one first connector passes through the at least one mounting hole and is connected with the at least one second connector on the backlight side so as to shorten distance between the light guiding parts and the corresponding light emitting parts.

In one possible solution, the radiator comprises a heat radiating side portion (that is, a bottom wall of a mounting groove); the heat radiating side portion abuts against the lamp board, and at least one avoidance groove is arranged on the heat radiating side portion at the position corresponding to the at least one mounting hole, and the at least one second connector is arranged in the at least one avoidance groove.

In one possible solution, at least one first threaded hole is provided on bottom wall of the at least one avoidance groove, and at least one second threaded hole is provided on the at least one second connector; the floodlight comprises at least one first fastener and the at least one first fastener can be screwed with the at least one second threaded hole and the at least one first threaded hole respectively to fix the at least one second connector in the at least one avoidance groove.

In one possible solution, ventilation gap is formed between parts of the at least one first connector located in the at least one mounting hole and a peripheral wall of the at least one mounting hole.

In one possible solution, each of the at least one second connector comprises two elastic arms extending in parallel, and a clamping space is formed between the two elastic arms; and one of the two elastic arms can move in the direction away from the other elastic arm; and the at least one first connector comprises at least one clamping part, and the at least one clamping part extends into the corresponding clamping space and presses the two elastic arms.

In one possible solution, at least one elastic arm comprises two straight arms and two bending arms which are connected; each of the straight arms is fixed on the radiator, and the two straight arms and the two bending arms extend in parallel; a minimum distance between the two bending arms is smaller than the minimum distance between the two straight arms, and the minimum distance between the two bending arms is smaller than a maximum width of the at least one clamping part.

In one possible solution, each of the at least one first connector comprises at least one column fixed on the near light side portion and at least one second fastener; the at least one column is provided with at least one third threaded hole; the at least one second fastener is threadedly connected with the at least one third threaded hole; and at least part of structure of the at least one second fastener is exposed outside the at least one column to form the at least one clamping part.

In one possible solution, an end face of the at least one second fastener far away from the near light side portion is set as at least one outward convex arc surface.

In one possible solution, the floodlight also comprises at least one limiting piece and at least one movable piece; the at least one limiting piece is arranged on the radiator, and the at least one movable piece is movably arranged on the frame; when the frame is in a fixed position, the at least one movable piece can move around the frame and move to a locked position and an unlocked position; when the at least one movable piece is in the locked position, the at least one movable piece is connected with the at least one limiting piece to limit rotation of the frame on the radiator; and when the at least one movable piece is in the unlocked position, the at least one movable piece is separated from the at least one limiting piece.

In one possible solution, the radiator is formed with a mounting groove, in which both the lamp board and the lens are arranged; the lamp board abuts against the bottom wall of the mounting groove, and an annular groove is formed between an outer peripheral wall of the lens and a peripheral wall of the mounting groove;

- the frame comprises an annular part and an abutment part which are connected; the annular part is rotatably arranged on the radiator; when the frame is in a fixed position, the annular part moves into the annular groove, and the abutment part moves to side of the lens facing away from the bottom wall of the mounting groove and abuts against the lens; and
- the at least one limiting piece comprises at least one limiting part arranged in the annular groove; the at least one movable piece is movably arranged in the annular part; and the at least one movable piece is detachably connected with the at least one limiting part in the annular groove.

In one possible solution, the at least one limiting part is spaced from the bottom wall of the mounting groove; and

- the at least one movable piece comprises at least one main arm and at least one sub-arm, which are connected at an included angle; the at least one main arm and the at least one sub-arm enclose and form at least one assembly space; when the at least one movable piece is in the locked position, the at least one limiting part is clamped into the at least one assembly space, and one of the at least one main arm and the at least one sub-arm is located on side of the at least one limiting part facing the bottom wall of the mounting groove, and the other is located on the side of the at least one limiting part facing away from the bottom wall of the mounting groove.

In one possible solution, the at least one main arm is rotatably arranged in the annular part, and the at least one main arm rotates to drive the at least one sub-arm to move to the side of the at least one limiting part facing the bottom wall of the mounting groove, or to drive the at least one sub-arm to escape from the side of the at least one limiting part facing the bottom wall of the mounting groove.

In one possible solution, an outer peripheral surface of the at least one limiting part is arranged as at least one arc surface; and

- at least one concave arc surface is formed at joints of the at least one main arm and the at least one sub-arm, and the at least one limiting part is clamped in the spaces formed by the at least one concave arc surface; at least one guide inclined surface is formed at sides of the at least one sub-arm close to the at least one main arm, and one end of the at least one guide inclined surface is connected with the at least one concave arc surface, and the other end of the at least one guide inclined surface extends obliquely in the direction away from the at least one main arm.

In one possible solution, the at least one main arm is connected with the annular part through at least one flexible gasket.

In one possible solution, at least one through-hole is provided on an outer peripheral wall of the annular groove, and at least one limiting piece extends into the annular groove through the at least one through-hole; and part of the at least one limiting piece located in the annular groove are formed as the at least one limiting part.

In one possible solution, at least one upright post is arranged in the annular groove, and the at least one upright post is arranged at extension of an axis of the at least one through-hole; and one end of the at least one limiting piece located in the annular groove is fixedly connected with the at least one upright post.

In one possible solution, an outer peripheral wall of the at least one limiting piece is formed with at least one external thread;

- a peripheral wall of the at least one through-hole is provided with at least one internal thread, and the at least one external thread is in threaded connection with the at least one internal thread; and
- at least one threaded hole is provided on the at least one upright post, and the at least one external thread of the at least one limiting piece 7 is in threaded connection with the threaded part on the peripheral wall of the at least one threaded hole.

With regard to a lighting assembly in the technical solutions of the present invention, the at least one first connector is arranged on a back surface of the lens (the surface facing the lamp board), and the at least one second connector detachably fixed with the at least one first connector are arranged on the radiator, so that the lens and the radiator can be firmly connected without screwing a front surface of the lens (the surface facing away from the lamp board), thus need for opening holes in the lens is avoided, and damages to the lens and additional waterproof treatment are also avoided, thus simplifying production process and maintaining beautiful appearance of the product.

At the same time, after the at least one first connector and the at least one second connector are fixed together, the lens can be restricted from moving away from the lamp board, which can prevent the lens from protruding away from the lamp board; in addition, during connections of the first connectors and the at least one second connector, at least one connector will pass through the at least one mounting hole, which can effectively limit the lamp board and prevent the lamp board from moving at will in a diameter direction of the at least one mounting hole.

Finally, the at least one mounting hole also facilitates cold air to move from the radiator to the lens, so as to reduce temperature of the lens and prevent the lens from being softened by heating; and heat can also be transferred between the at least one first connector and the at least one second connector, thus effectively reducing the temperature of the lens.

DESCRIPTION OF DRAWINGS

In order to more clearly explain technical solutions in embodiments of the present invention or in the prior art, drawings needed to be used in description of the embodiments or the prior art will be briefly introduced below. Obviously, the drawings in the following description are only some embodiments of the present invention, and for those skilled in the art, other drawings can be obtained according to structures shown in these drawings without creative work.

DESCRIPTION OF REFERENCE NUMBERS

Figure 1:
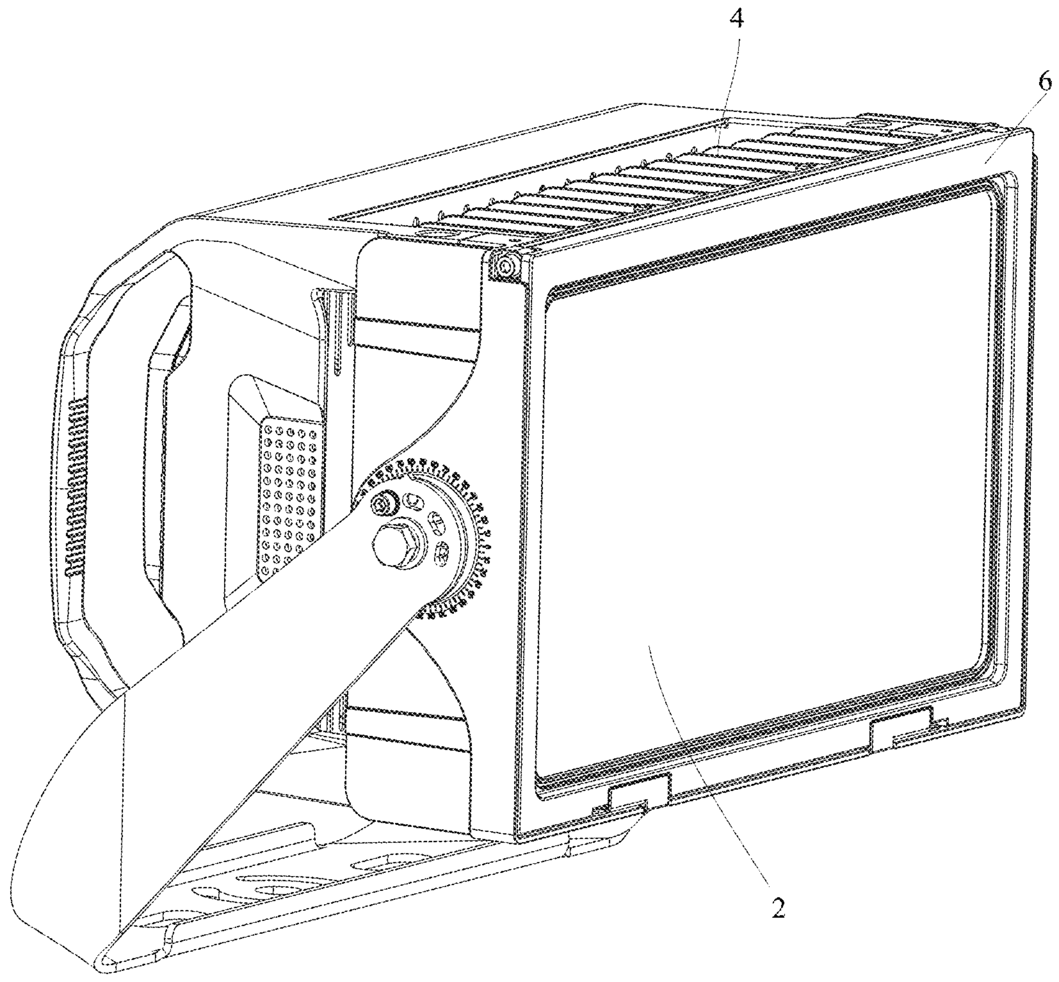
FIG. 1 is a schematic structural diagram of an embodiment of a floodlight in the present patent.
Figure 2:
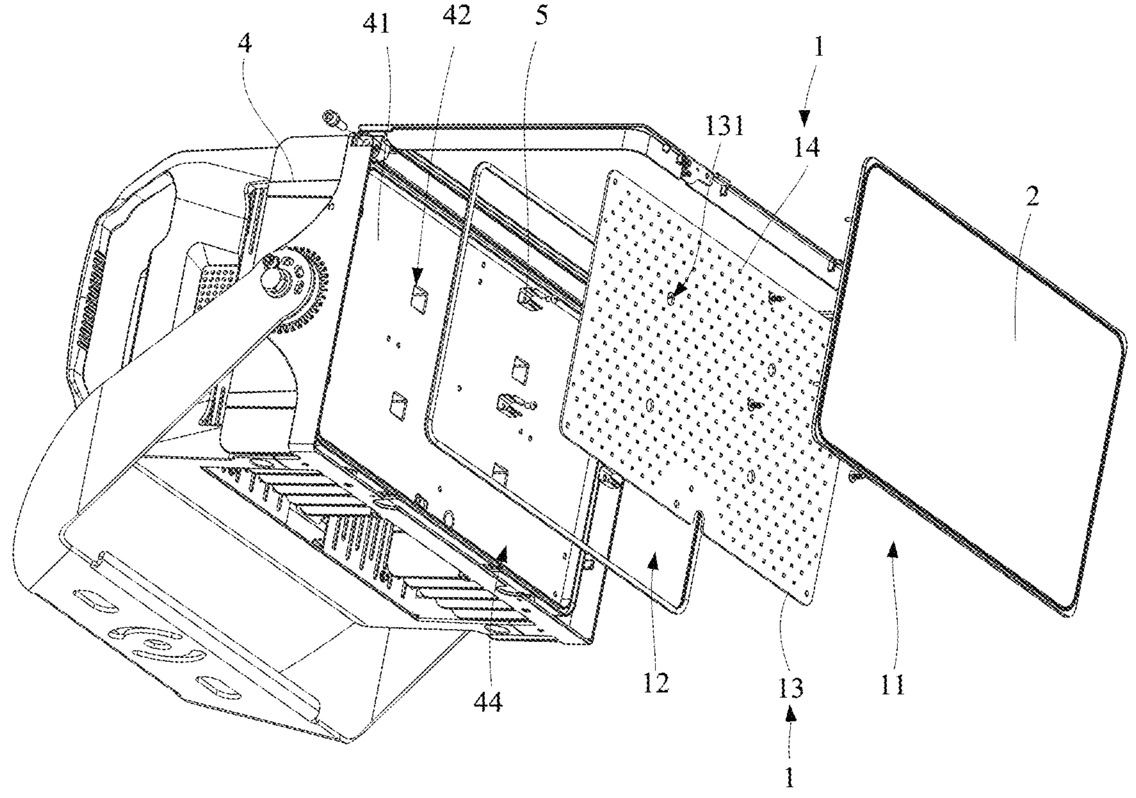
FIG. 2 is an exploded schematic view of the floodlight in FIG. 1.

1. lamp board; 11. light emitting side; 12. backlight side; 13. plate body; 131. mounting hole; 14. light emitting part; 2. lens; 21. near light side portion; 22. light guiding part; 3. first connector; 31. column; 32. second fastener; 321, clamping part; 4. radiator; 41, heat radiating side portion; 42. avoidance groove; 43. first fastener; 44. mounting groove; 45. annular groove; 46. upright post; 5. second connector; 51. elastic arm; 511. straight arm; 512. bending arm; 52. clamping space; 6. frame; 61. annular part; 62. abutment part; 7. limiting piece; 71. limiting part; 8. movable piece; 81. main arm; 82. sub-arm; 821, concave arc surface; 822, guide inclined surface; 83. assembly space; and 9. flexible gasket.

Realization, functional characteristics and advantages of the present invention will be further described with reference to the attached drawings in combination with embodiments.

EMBODIMENTS

In the following paragraphs, technical solutions in the embodiments of the present invention will be clearly and completely described with reference to the attached drawings. Obviously, the described embodiments are only some of the embodiments of the present invention, but not the whole embodiments. Based on the embodiments in the present invention, all other embodiments obtained by those skilled in the art without creative work belong to the protective scope of the present invention.

It should be noted that if there are directional indications (such as up, down, left, right, front, back, etc.) in the embodiments of the present invention, the directional indications are only used to explain relative positional relationships, movement situations, etc. between components in a certain posture (as shown in the attached drawings), and if the certain posture changes, the directional indications also change accordingly.

In addition, descriptions of "first" and "second" in the present invention are only used for descriptive purposes, and cannot be understood as indicating or implying their relative importance or implicitly indicating number of indicated technical features. Therefore, the features defined as "first" and "second" can explicitly or implicitly comprise at least one of these features. In addition, "and/or" in the full text comprises three solutions, taking A and/or B as examples, comprising technical solution A, technical solution B, and technical solutions in which A and B are realized simultaneously; in addition, the technical solutions of various embodiments can be combined with each other and must be based on what can be realized by those skilled in the art. When the combination of technical solutions is contradictory or impossible, it should be considered that the combination of technical solutions does not exist and is not within the protective scope required by the present invention.

The present invention provides a floodlight.

In the embodiments of the present invention, as shown in FIGS. 1 to 7, the floodlight comprises a lamp board 1, a lens 2, a radiator 4 and a frame 6;

the lamp board 1 has a light emitting side 11 and a backlight side 12, and at least one mounting hole 131 is provided on the lamp board 1;

the lens 2 is arranged on the light emitting side 11, and the lens 2 has a near light side portion 21 close to the lamp board 1, and at least one first connector 3 is provided on the near light side portion 21 corresponding to the position where the at least one mounting hole 131 is provided;

the radiator 4 is arranged on the backlight side 12, and at least one second connector 5 are arranged on the radiator 4 corresponding to the position where the at least one mounting hole 131 is provided; and one of the at least one first connector 3 and the at least one second connector 5 can pass through the at least one mounting hole 131 and be detachably connected with the other; and the frame 6 is rotatably arranged on the radiator 4, and can rotate around the radiator 4, and can be rotated to a fixed position and a dismounting position; when the frame 6 is in the fixed position, the frame 6 abuts against the lens 2, so as to the lens 2 moves in a direction close to the radiator 4; and when the frame 6 is in the dismounting position, the frame 6 is separated from the lens 2 to avoid the lens 2 being detached from the radiator 4.

Specifically, when the lamp panel 1 is energized, one side of the lamp panel 1 is bright, while the other side of the lamp panel 1 is not; and in the embodiments of the present invention, the bright side is called the light emitting side 11 of the lamp panel 1, and the dark side is called the backlight side 12 of the lamp panel 1.

With regard to a lighting assembly in the technical solutions of the present invention, the at least one first connector 3 are arranged on a back surface of the lens 2 (the surface facing the lamp board 1), and the at least one second connector 5 detachably fixed with the at least one first connector 3 are arranged on the radiator 4, so that the lens 2 and the radiator 4 can be firmly connected without screwing a front surface of the lens 2 (the surface facing away from the lamp board 1), thus need for opening holes in the lens 2 is avoided, and damages to the lens 2 and additional waterproof treatment are also avoided, thus simplifying production process and maintaining beautiful appearance of the product.

At the same time, after the at least one first connector 3 and the at least one second connector 5 are fixed together, the lens 2 can be restricted from moving away from the lamp board 1, which can prevent the lens 2 from protruding away from the lamp board 1; in addition, during connections of the at least one first connector 3 and the at least one second connector 5, connectors will pass through the at least one mounting hole 131, which can effectively limit the lamp board 1 and prevent the lamp board 1 from moving at will in diameter direction of the at least one mounting hole.

Finally, the at least one mounting hole 131 also facilitates cold air to move from the radiator 4 to the lens 2, so as to reduce temperature of the lens 2 and prevent the lens 2 from being softened by heating; and heat can also be transferred between the at least one first connector 3 and the at least one second connector 5, thus effectively reducing the temperature of the lens 2.

Specifically, in some embodiments, one of the at least one first connector 3 and the at least one second connector 5 can be designed to be elastic, and the at least one first connector 3 and the at least one second connector 5 are clamped together by elastic force during installation, which does not require additional tools and simplifies installation process.

In other embodiments, the at least one first connector 3 and the at least one second connector 5 can be designed as plug posts and slots respectively, and the connection can be realized by inserting the plug posts into the slots, which is simple and convenient, and is suitable for quick installation and disassembly.

In other more embodiments, the at least one first connector 3 and the at least one second connector 5 can be designed as magnetic materials, and the at least one first connector 3 and the at least one second connector 5 are attracted together by magnetic force during installation, so as to realize the connection; and since there are many embodiments of the connection of the at least one first connectors 3 and the at least one second connector 5, they are not listed here.

Figure 3:
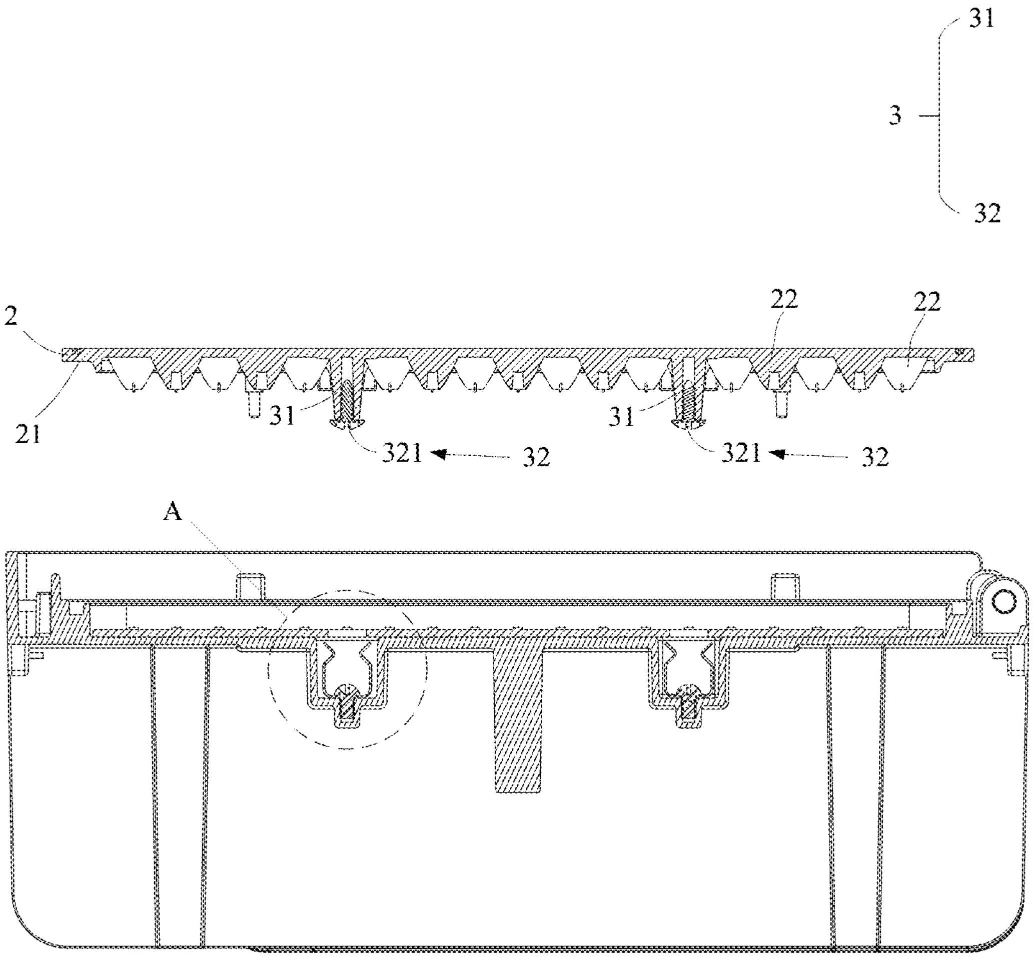
FIG. 3 is a sectional view of the floodlight in FIG. 1 after decomposition.
Figure 6:
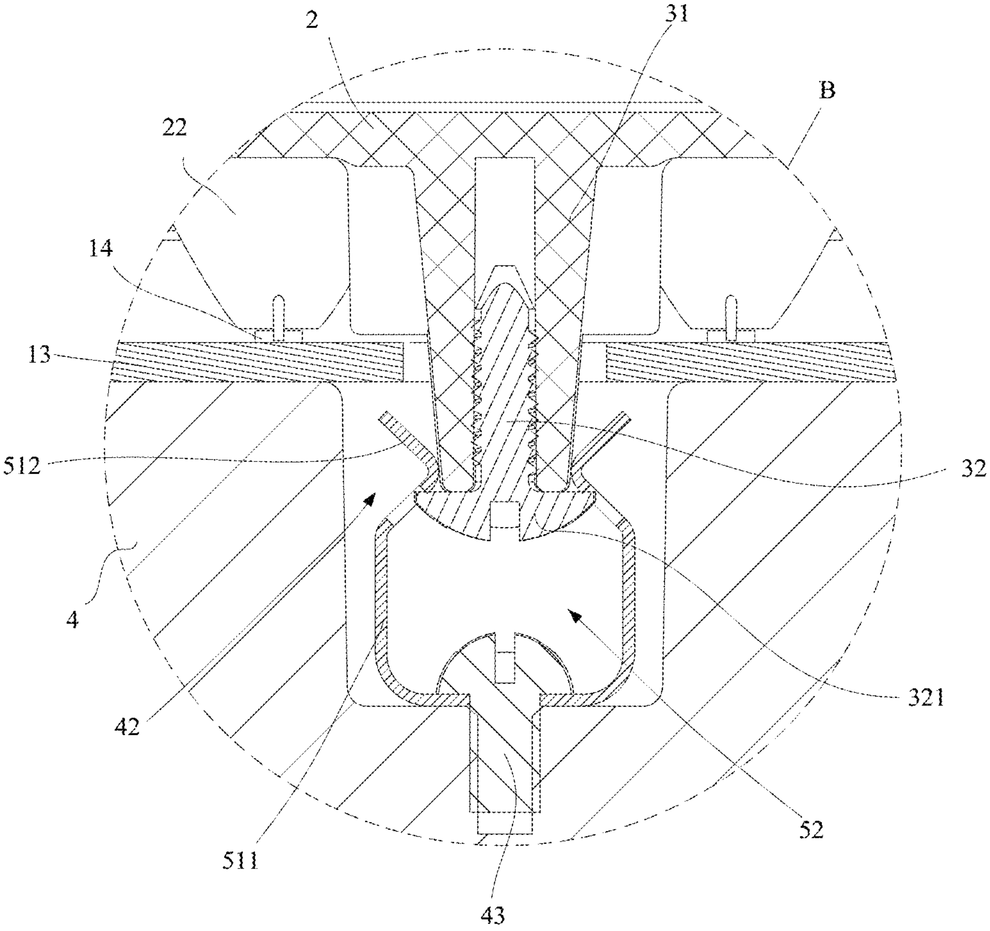
FIG. 6 is a partially enlarged view at the area "B" in FIG. 5.
Figure 7:
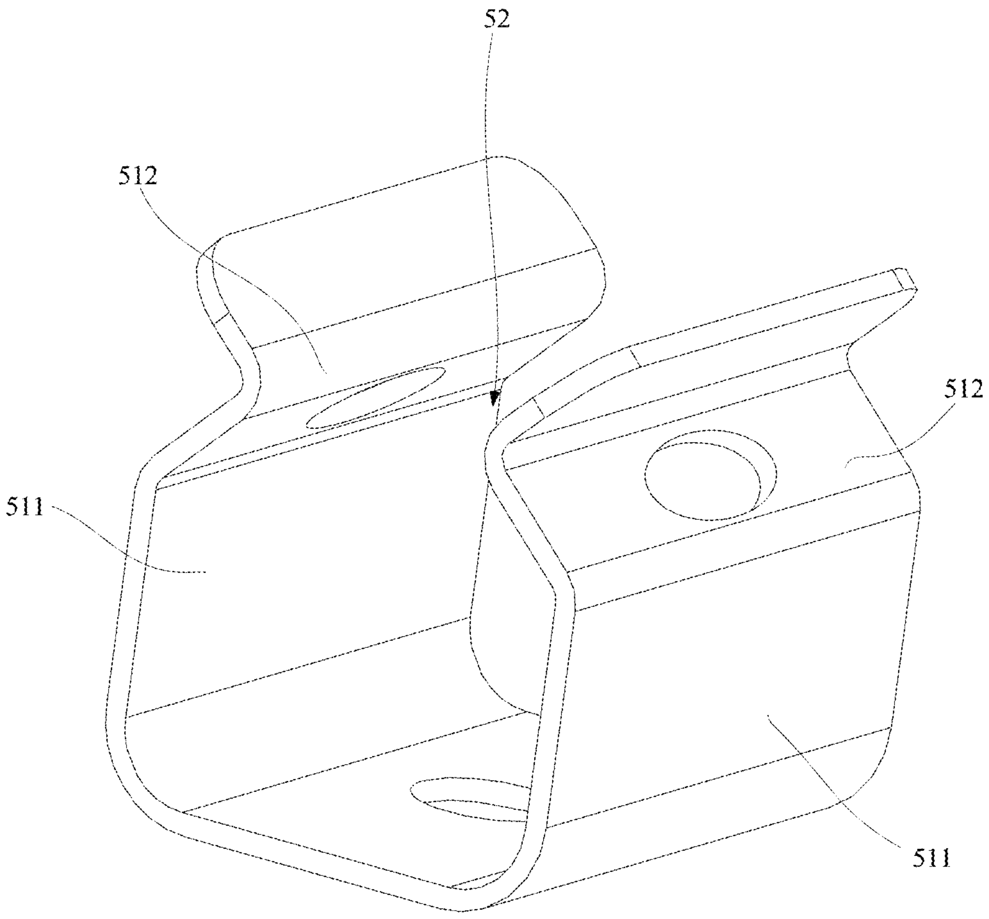
FIG. 7 is a schematic structural view of a second connector.
Figure 8:
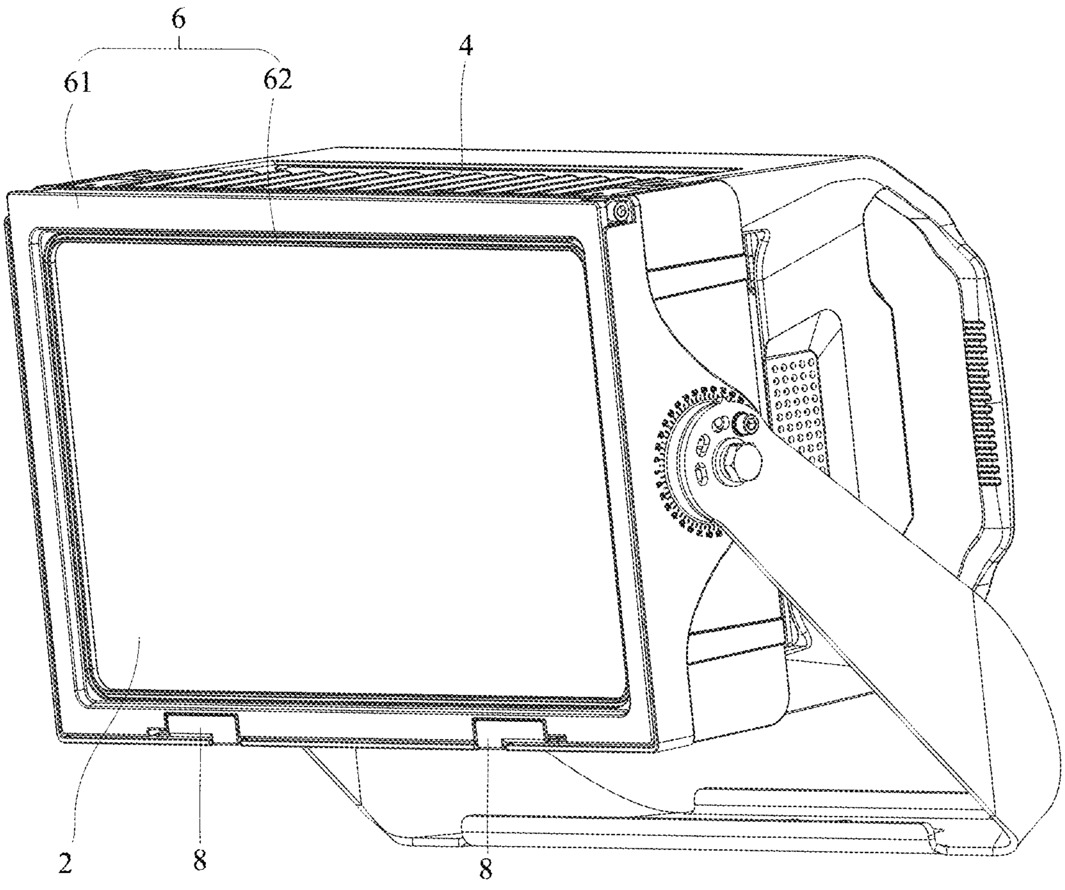
FIG. 8 is a schematic structural view of the floodlight in FIG. 1 from another perspective (in this case, a frame is in a fixed position)
Figure 9:
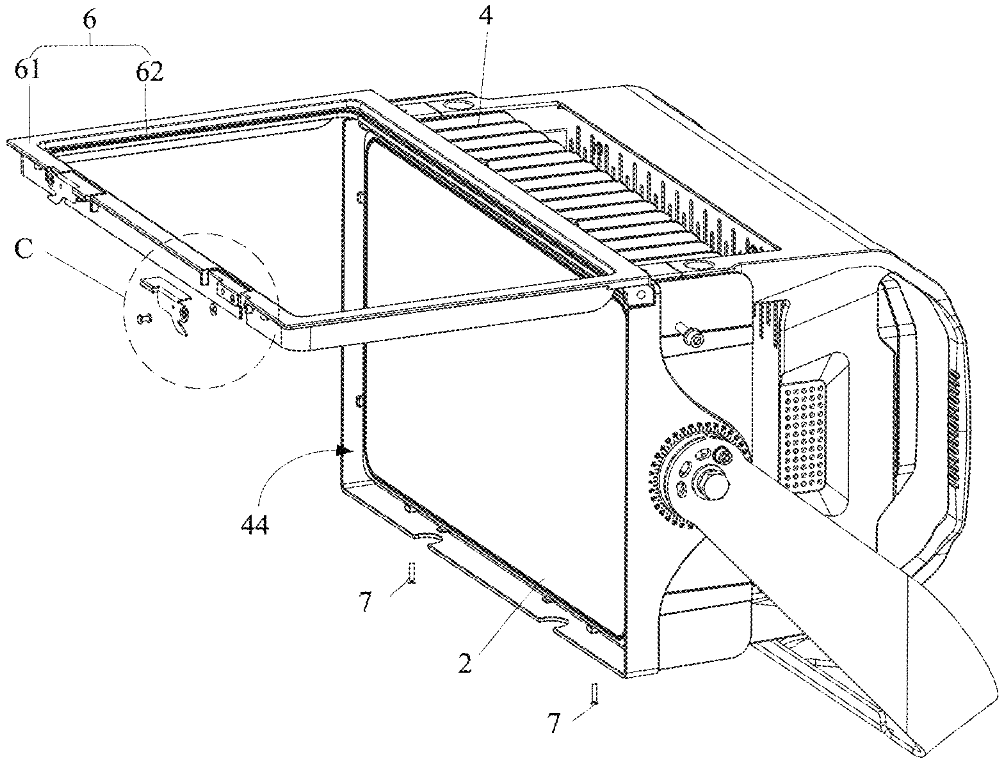
FIG. 9 is an exploded schematic view of the frame in FIG. 8 after rotating to a dismounting position.
Figure 10:
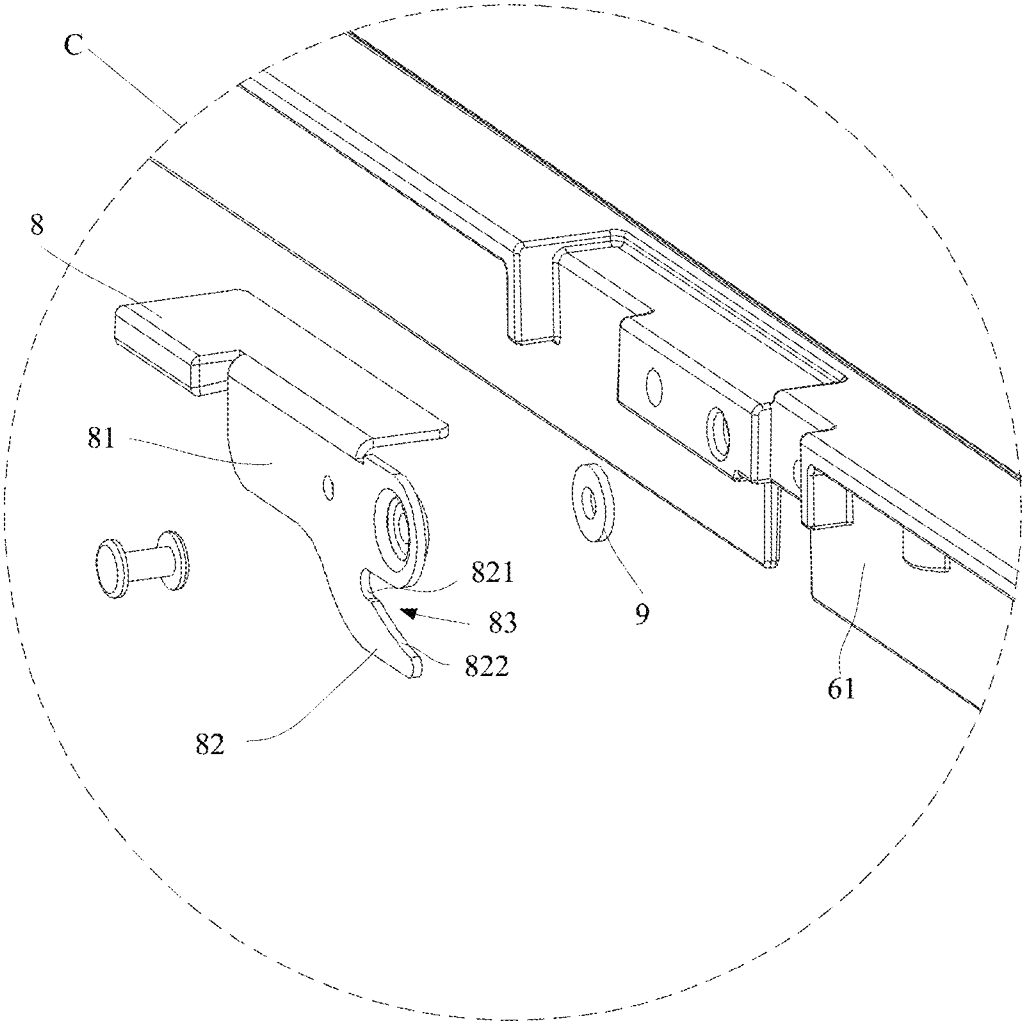
FIG. 10 is a partially enlarged view at the area "C" in FIG. 9.
Figure 11:
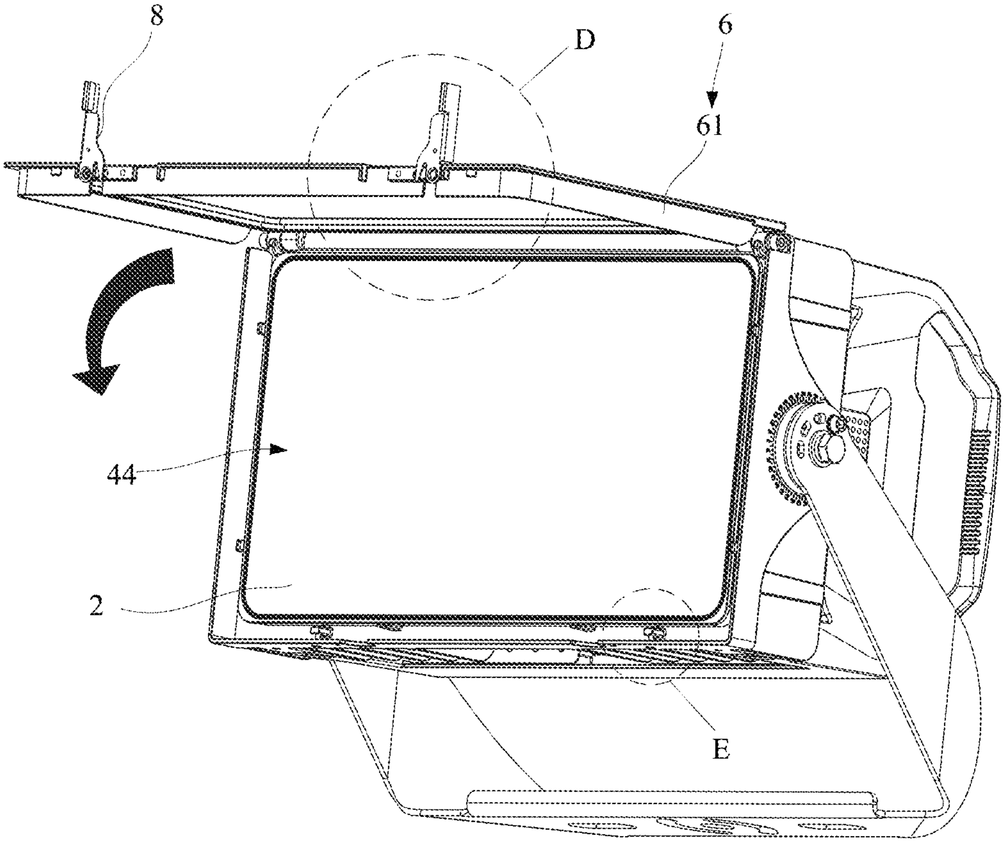
FIG. 11 is a schematic structural view of the frame in FIG. 8 after rotating to a dismounting position.
Figure 12:
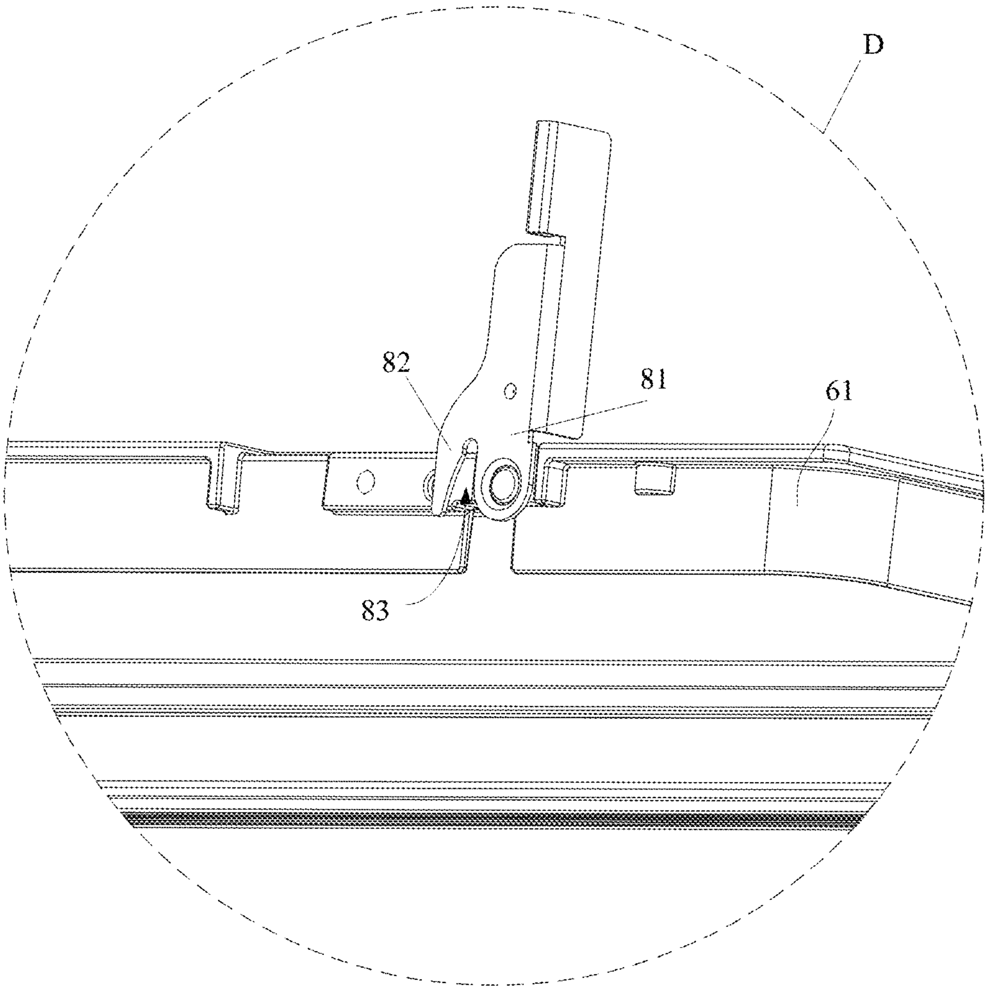
FIG. 12 is a partially enlarged view at the area "D" in FIG. 11.
Figure 13:
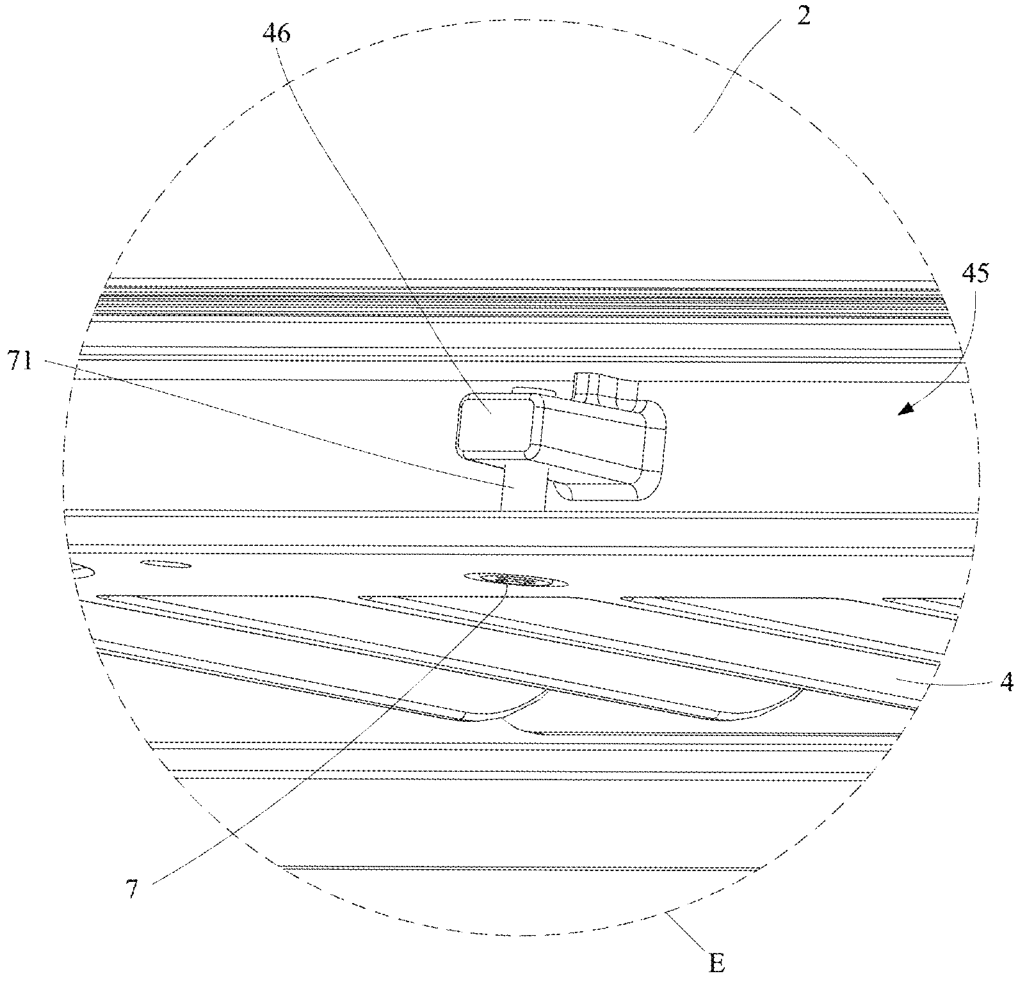
FIG. 13 is a partially enlarged view at the area "E" in FIG. 11.
Figure 14:
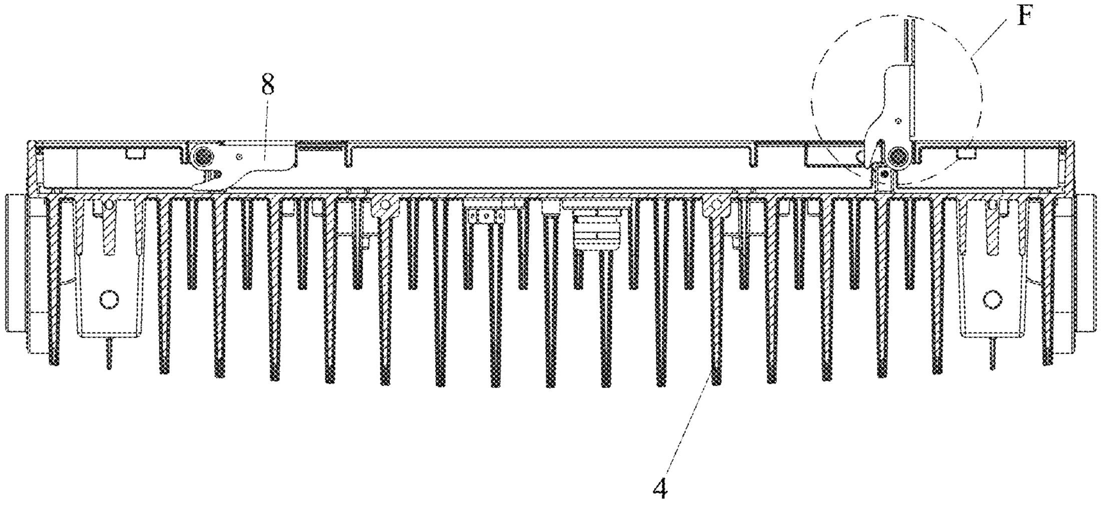
FIG. 14 is a sectional view of FIG. 8 with parts of the structure omitted (in this case, a movable piece is in an unlocked position)
Figure 15:
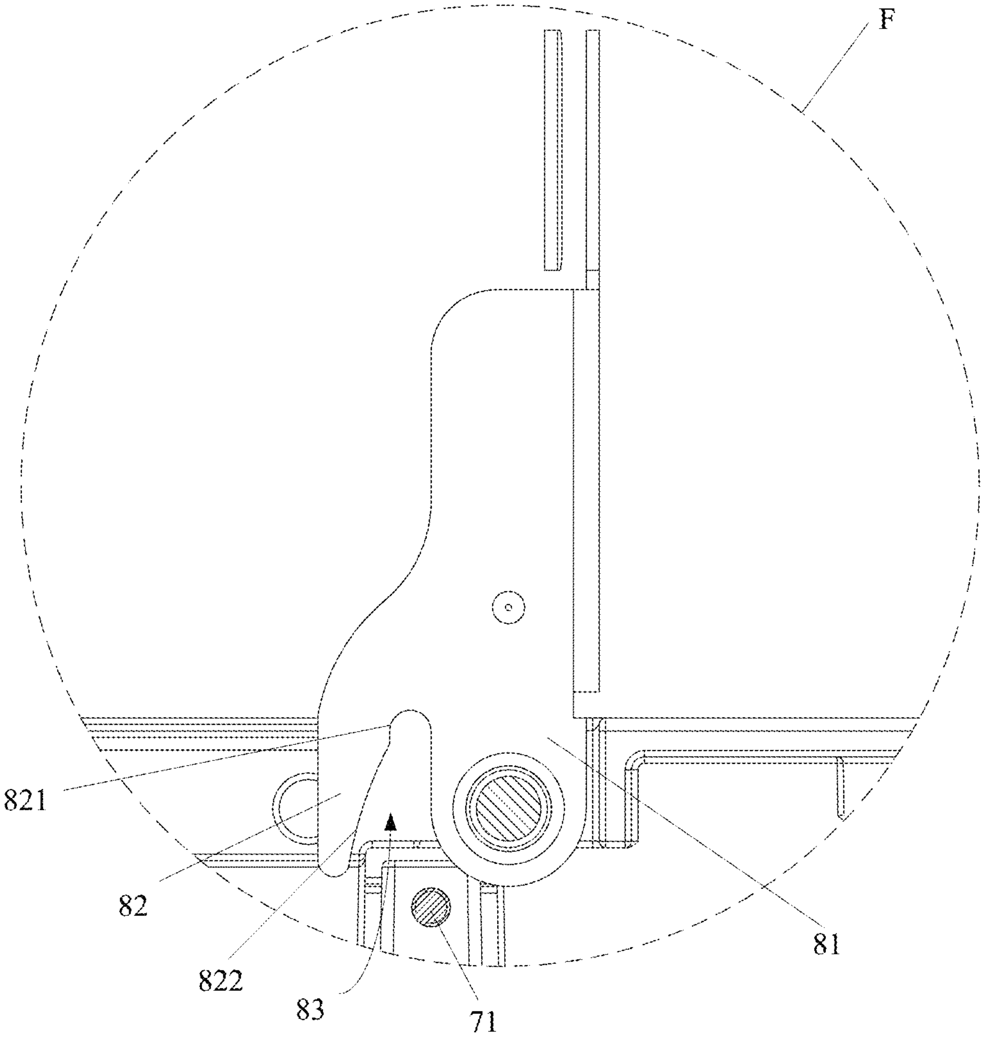
FIG. 15 is a partially enlarged view at the area "F" in FIG. 14.
Figure 16:
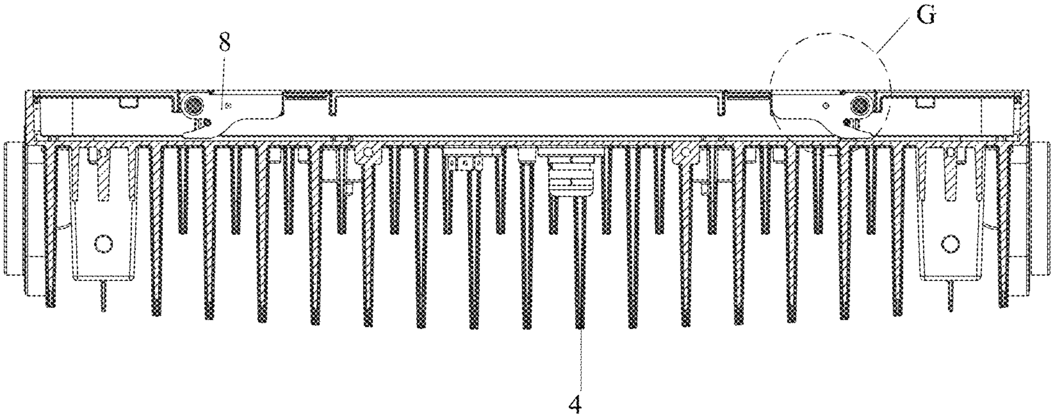
FIG. 16 is a sectional view of FIG. 8 with parts of the structure omitted (in this case, the movable piece is in a locked position)
Figure 17:
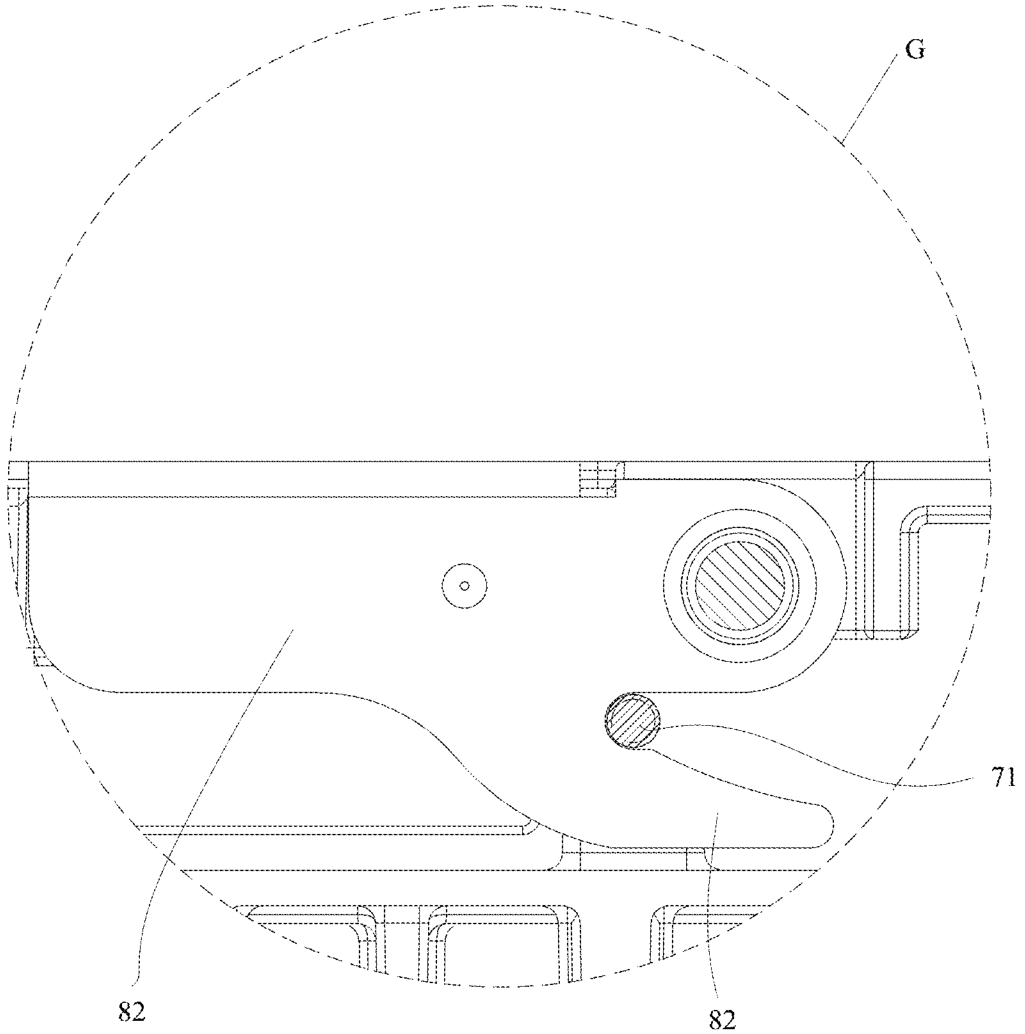
FIG. 17 is a partially enlarged view at the area "G" in FIG. 16.

Specifically, referring to FIGS. 3 and 6, the lamp board 1 comprises a plate body 13 and a plurality of light emitting parts 14 arranged on the plate body 13, and at least one mounting hole 131 is arranged on the plate body 13;

- a plurality of light guiding parts 22 are provided on the near light side portion 21 corresponding to the plurality of light emitting parts 14 one by one; and
- height of the at least one first connector 3 protruding from a surface of the near light side portion 21 is greater than height of the light guiding parts 22 protruding from the surface of the near light side portion 21; and the at least one first connector 3 passes through the at least one mounting hole 131 and is connected with the at least one second connector 5 on the backlight side 12 so as to shorten distance between the light guiding parts 22 and the corresponding light light emitting parts 14.

Specifically, the light emitting parts 14 can be LED lamp beads arranged on the plate body 13, and the light guiding parts 22 can be light guiding columns or bowl structures.

It is not difficult to understand that by adding the light guiding parts 22, light emitted by the corresponding light emitting parts 14 can be guided more effectively, so that the light of each light emitting part 14 can be intensively irradiated to the target area, and lighting effect is improved.

Compared with the way of assembling the at least one first connector 3 and the at least one second connector 5 on the light emitting side 11, in the present invention, by assembling the at least one first connector 3 and the at least one second connector 5 on the backlight side 12, the distance between the light guiding parts 22 and the light emitting parts 14 are effectively shortened so as to reduce loss of light in transmission process, improve optical performance of the lighting assembly, and make the light more uniform and stable.

Preferably, the light guiding parts 22 are bowl structures, and openings are provided on ends of the bowl structures close to the plate body 1; after the at least one first connector 3 and the at least one second connector 5 are assembled, the light emitting parts 14 can extend into the bowl structures through the corresponding openings, or the light emitting parts 14 are in the openings.

Figure 4:
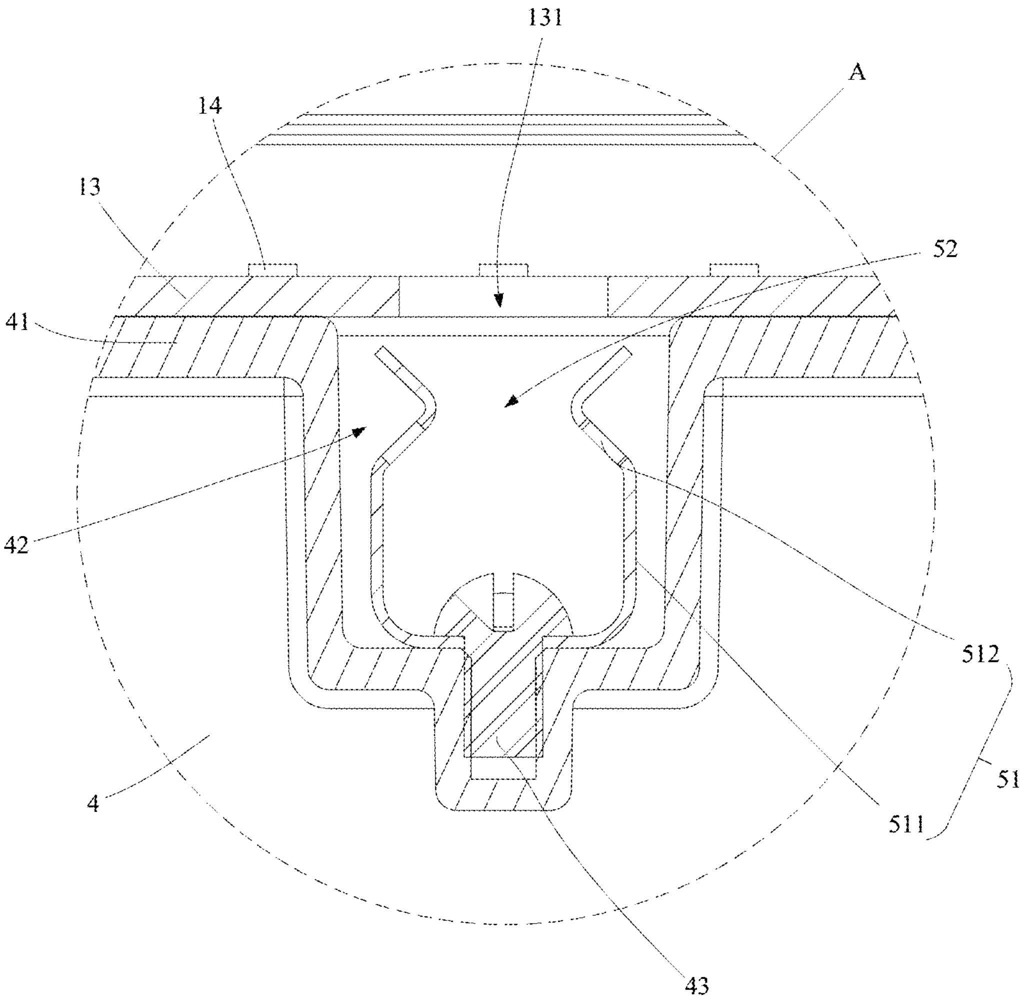
FIG. 4 is a partially enlarged view at the area "A" in FIG. 3.
Figure 5:
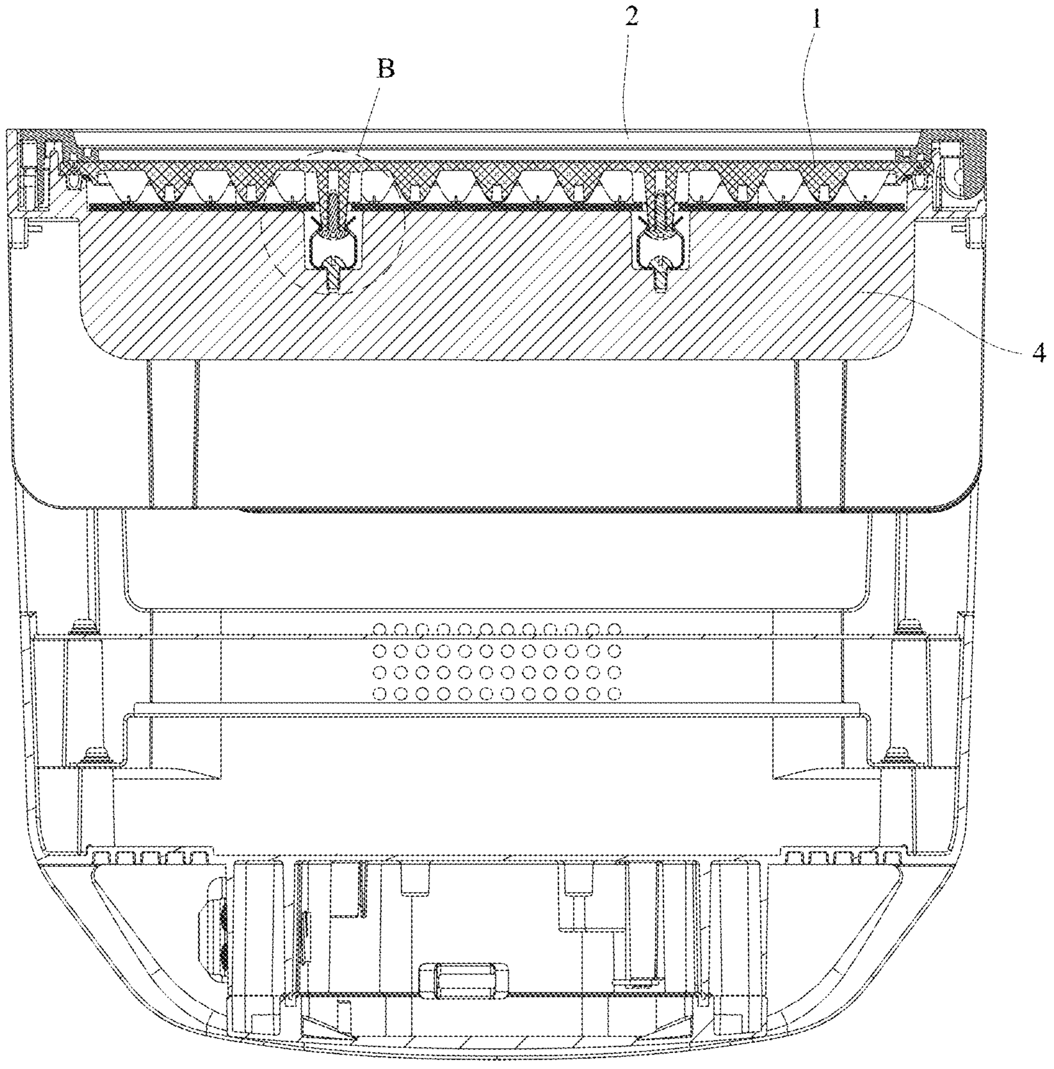
FIG. 5 is a sectional view of the floodlight in FIG. 1.

Referring to FIG. 4, the radiator 4 comprises a heat radiating side portion 41 (that is, a bottom wall of a mounting groove 44); the heat radiating side portion 41 abuts against the lamp board 1, and at least one avoidance groove 42 is arranged on the heat radiating side portion 41 at a position corresponding to the at least one mounting hole 131, and the at least one second connector 5 is arranged in the at least one avoidance groove 42.

The at least one avoidance groove 42 is designed to accommodate the at least one second connector 5, which prevents the at least one second connector 5 from being arranged between the heat radiating side portion 41 and the lamp board 1, thus ensuring an effective contact between the heat radiating side portion 41 and the lamp board 1 without being interfered by the at least one second connector 5; the heat radiating side portion 41 is an important part of the radiator 4 and is designed to abut against the lamp board 1 to ensure effective heat dissipation and conduction; and in the process of heat transfer, heat of the lamp board 1 is directly transferred to the radiator 4 without passing air, which improves the heat dissipation efficiency, effectively reduces working temperature of the lamp board 1 and prolongs service life of the lamp board 1.

At least one first threaded hole is provided on a bottom wall of the at least one avoidance groove 42, and at least one second threaded hole is provided on the at least one second connector 5; the floodlight comprises at least one first fastener 43 and the at least one first fastener 43 can be screwed with the at least one second threaded hole and the at least one first threaded hole respectively to fix the at least one second connector 5 in the at least one avoidance groove 42.

In practice, the at least one first fastener 43 can be bolts, screws, fixing pins and other structures, and are not specifically limited here.

It can be understood that introduction of the at least one first fastener 43 enables the at least one second connector 5 to be assembled and disassembled independently of the radiators 4. This modular design helps to quickly replace or upgrade specific components of the floodlight, thus reducing maintenance and updating costs.

Ventilation gap is formed between parts of the at least one first connector 3 located in the at least one mounting hole 131 and a peripheral wall of the at least one mounting hole 131.

It can be understood that the ventilation gap provides a passage from the radiator 4 to the lens 2, so that the cold air around the radiator 4 can move to the lens 2 through the ventilation gap, which is helpful to reduce the working temperature of the lens 2 and the side of the lamp board 1 facing away from the radiator 4.

The ventilation gap can also reduce humidity and possibility of water vapor condensation inside the floodlight; through the ventilation gap, air can circulate, reducing the humidity inside the floodlight, effectively preventing influence of water vapor condensation on internal components of the floodlight, and improving stability and reliability of the floodlight.

The at least one second connector 5 comprises two elastic arms 51 extending in parallel, and a at least one clamping space 52 is formed between the two elastic arms 51; and one of the two elastic arms 51 can move in the direction away from the other elastic arm 51.

The at least one first connector 3 comprises at least one clamping part 321, and the at least one clamping part 321 extends into the at least one corresponding clamping space 52 and presses the two elastic arms 51.

The two elastic arms 51 of the at least one second connector 5 have certain elasticity, and one of the two elastic arms 51 can move in the direction away from the other elastic arm 51. This design enables the at least one second connector 5 to adapt to the at least one first connector 3 with more sizes or shapes.

The at least one clamping part 321 of the at least one first connector 3 extend into the at least one corresponding clamping space 52 and press the two elastic arms 51 to form fixed connections. This structural design does not need additional tools or complicated operations, which makes the installation process simpler, helps to improve assembly efficiency and reduces assembly costs.

Design of the at least one elastic arm 51 can buffer and absorb vibration and impact generated by the lamp board 1 and the lens 2 during use, thereby reducing the vibration transmitted to other parts and reducing noises.

At least one elastic arm 51 comprises two straight arms 511 and two bending arm 512 which are connected; each of the straight arms 511 is fixed on the radiator 4, and the two straight arms 511 and the two bending arms 512 extend in parallel; a minimum distance between the two bending arms 512 is smaller than the minimum distance between the two straight arms 511, and the minimum distance between the two bending arms 512 is smaller than a maximum width of each of the at least one clamping part 321.

It can be understood that the minimum distance between the two bending arms 512 is set to be smaller than the maximum diameter of the at least one clamping part 321, which ensures that the at least one clamping part 321 can be firmly clamped between the two bending arms 512 during connection, and prevents the at least one clamping part 321 from easily escaping from between the two elastic arms 51.

The at least one first connector 3 comprises at least one column 31 fixed on the near light side portion 21 and at least one second fastener 32; the at least one column 31 is provided with at least one third threaded hole; the at least one second fastener 32 is threadedly connected with the at least one third threaded hole; and at least part of structure of the at least one second fastener 32 is exposed outside the at least one column 31 to form the at least one clamping part 321.

In practice, the at least one second fastener 32 can be bolts, screws, fixing pins and other structures, and are not specifically limited here.

The at least one column 31 is in close contact with the near light side portion 21, which can effectively conduct part of heat of the lens 2 and help the radiator 4 to dissipate heat quickly.

By adjusting length of the at least one second fastener 32 or installation depth of the at least one second fastener 32 on the at least one column 31, height of the at least one first connector 3 protruding from the near light side portion 21 can be adjusted, which is convenient for controlling depth of the at least one first connector 3 inserted into the at least one avoidance groove 42 and adjusting distance between the light emitting parts 14 and the light guiding parts 22.

An end face of the at least one second fastener 32 far away from the near-light side portion 21 is set as outward at least one outward convex arc surface; the out ward at least one outward convex arc surface is beneficial to reduce friction and resistance with the at least one elastic arm 51, so that the at least one second fastener 32 can be inserted deep into the at least one clamping space 52 more easily, and convenience of operation is improved.

The rounded at least one outward convex arc surface can reduce damages to the at least one elastic arm 51 and other components during installation; compared with sharp corners, the at least one outward convex arc surface is gentler, thus reducing scratches or wears on a surface of the at least one elastic arm 51 and prolonging service life of the assembly.

Referring to FIG. 8 to FIG. 17, the floodlight also comprises at least one limiting piece 7 and at least one movable piece 8; the at least one limiting piece 7 is arranged on the radiator 4, and the at least one movable piece 8 is movably arranged on the frame 6; when the frame 6 is in a fixed position, the at least one movable piece 8 can move around the frame 6 and move to a locked position and an unlocked position; when the at least one movable piece 8 is in the locked position, the at least one movable piece 8 is connected with the at least one limiting piece 7 to limit rotation of the frame 6 on the radiator 4; and when the at least one movable piece is in the unlocked position, the at least one movable piece 8 is separated from the at least one limiting piece 7.

Specifically, the radiator 4, as a basic component of the floodlight, is mainly responsible for dissipating the heat generated by the lamp board 1 to ensure normal working temperature of the floodlight; and the lamp board 1 is directly arranged on and closely abuts against the radiator 4. This configuration ensures that heat generated by the light source can be effectively transferred to the radiator 4 and dissipated to external environment.

The design of the frame 6 allows it to be rotatably arranged on the radiator 4, and can rotate between the fixed position and the dismounting position; when the frame 6 is in the fixed position, the lens 2 is tightly pressed on the radiator 4, thus ensuring stability and heat dissipation efficiency of the light source; when the lamp board 1 or lens 2 needs to be maintained or replaced, the lamp board 1 or lens 2 can be easily detached from the radiator 4 by rotating the frame 6 to the dismounting position without any additional tools.

The at least one limiting piece 7 is fixed on the radiator 4, and the at least one movable piece 8 is movably arranged on the frame 6, and the movable piece 8 can move linearly and reciprocally or rotate; for example, if the at least one movable piece 8 adopts linear reciprocating motion, they may be connected with the frame 6 through sliders and guide rail structures; If the at least one movable piece 8 adopts rotating mode, it may be connected with the frame 6 through hinges or rivets or rotating shafts, and the at least one movable piece 8 can move between the locked position and the unlocked position in either way; when in the locked position, the at least one movable piece 8 is connected with the at least one limiting piece 7 to fix the position of the frame 6 and prevent the frame 6 from rotating on the radiator 4; in the unlocked position, the at least one movable piece 8 is separated from the at least one limiting piece 7, allowing the frame 6 to rotate to the dismounting position, which is convenient for dismounting and mounting the lamp board 1 or the lens 2.

There are many connection modes between the at least one movable piece 8 and the at least one limiting piece 7. For example, in some embodiments, one of the at least one movable piece 8 and the at least one limiting piece 7 is designed with clamping grooves, and the other is designed with corresponding buckling structures; when the at least one movable piece 8 move to a specific position, the at least one movable piece 8 can be clamped into the clamping grooves or disengaged from the clamping grooves to realize connection or separation between the at least one movable piece 8 and the at least one limiting piece 7.

In other embodiments, by arranging magnets on the at least one movable piece 8 and the at least one limiting piece 7, the at least one movable piece 8 is attracted to the at least one limiting piece 7 by magnetic force to achieve a locking purpose; and when unlocking, the at least one movable piece 8 and the at least one limiting piece 7 are separated by applying a certain force.

The radiator 4 is formed with a mounting groove 44, in which both the lamp board 1 and the lens 2 are arranged; the lamp board 1 abuts against the bottom wall of the mounting groove 44, and an annular groove 45 is formed between an outer peripheral wall of the lens 2 and a peripheral wall of the mounting groove 44.

The frame 6 comprises an annular part 61 and an abutment part 62 which are connected. The annular part 61 is rotatably arranged on the radiator 4. When the frame 6 is in a fixed position, the annular part 61 moves into the annular groove 45, and the abutment part 62 moves to the side of the lens 2 facing away from the bottom wall of the mounting groove 44 and abuts against the lens 2.

The at least one limiting piece 7 comprises at least one limiting part 71 arranged in the annular groove 45; the at least one movable piece 8 is movably arranged in the annular part 61; and the at least one movable piece 8 is detachably connected with the at least one limiting part 71 in the annular groove 45.

The design of the mounting groove 44 creates a relatively closed space; when entering into the mounting groove 44, the cold air will not be easily driven by flow of outside air, so that the cold air can stay in the mounting groove 44 for a long time; this design effectively increases contact time among the cold air, the lamp board 1 and lens 2, enhances heat exchange efficiency between the cold air and hot air, and helps to reduce temperature of the lamp panel 1 and lens 2 more effectively, thus improving working efficiency of the product and prolonging the service life thereof.

The mounting groove 44 wraps the lamp board 1, the lens 2 and the frame 6, which not only provides additional structural support and protection, but also reduces risk of damages to the lamp board 1, the lens 2 and the frame 6 due to vibration or impact, at the same time, the wrapping can effectively avoid the exposure of the lamp board 1 and the lens 2, thus reducing erosion of the lamp board 1 by external pollutants such as dust and moisture, and further improving the stability and reliability of the floodlight.

A waterproof coil is arranged between the lens 2 and the bottom wall of the mounting groove 44, and the lens 2 is pressed against the waterproof collar by the frame 6, and the waterproof coil is in close contact with the bottom wall of the mounting groove 44, so that moisture can be prevented from entering the lamp board 1 inside the coil and causing damages to electrical components of the lamp board 1.

The at least one limiting part 71 is spaced from the bottom wall of the mounting groove 44; the at least one movable piece 8 comprises at least one main arm 81 and at least one sub-arm 82, which are connected at an included angle; the at least one main arm 81 and the at least one sub-arm 82 enclose and form at least one assembly space 83; when the at least one movable piece 8 is in the locked position, the at least one limiting part 71 are clamped into the at least one assembly space 83, and one of the at least one main arm 81 and the at least one sub-arm 82 is located on the side of the at least one limiting part 71 facing the bottom wall of the mounting groove 44, and the other is located on the side of the at least one limiting part 71 facing away from the bottom wall of the mounting groove 44.

When the at least one limiting part 71 is clamped into the at least one assembly space 83, the at least one main arm 81 and the at least one sub-arm 82 can stably clamp the at least one limiting part 7; this bidirectional clamping design greatly enhances stability of fixing structures, ensures that all parts of the floodlight can be stably fixed under various environmental conditions, including vibration or impact, and avoids use effect being affected or damaged due to looseness.

During assembly process, the user can simply clamp the at least one limiting part 71 into the at least one assembly space 83 to complete the fixation, without using any additional tools, which is simple and quick to operate, convenient for rapid installation and maintenance, and improves the convenience of use.

The at least one main arm 81 is rotatably arranged in the annular part 61, and the at least one main arm 81 rotates to drive the at least one sub-arm 82 to move to the side of the at least one limiting part 71 facing the bottom wall of the mounting groove 44, or to drive the at least one sub-arm 82 to escape from the side of the at least one limiting part 71 facing the bottom wall of the mounting groove 44.

Because the at least one main arm 81 is connected to the frame 6 by rotating rather than sliding or other ways that may cause great wear, this mechanism reduces the wear between components in long-term use and prolongs the service life.

An outer peripheral surface of the at least one limiting part 71 is arranged as at least one arc surface; and at least one concave arc surface 821 is formed at joints of the at least one main arm 81 and the at least one sub-arm 82, and the at least one limiting part 71 is clamped in the spaces formed by the at least one concave arc surface 821; at least one guide inclined surface 822 is formed at sides of the at least one sub-arm 82 close to the at least one main arm 81, and ends of the at least one guide inclined surface 822 are connected with the at least one concave arc surface 821, and the other ends of the at least one guide inclined surface 822 extend obliquely in the direction away from the at least one main arm 81.

The outer peripheral surface of the at least one limiting part 71 are designed as arranged as at least one arc surface; the at least one arc surface is clamped with the at least one concave arc surface 821 at the joints of the at least one main arm 81 and the at least one sub-arm 82; this design can provide smoother connection during unlocking or locking, reduce friction and wear, and thus improve the stability and durability of the structures.

The design of the at least one guide inclined surface 822 of the at least one sub-arm 82 near the sides of the at least one main arm 81 enables the limiting pars 71 to be smoothly guided into the spaces formed by the at least one concave arc surface 821 along the at least one guide inclined surface 822 during the clamping process, which not only simplifies the operation flow of installation and adjustment, but also reduces possible errors in operation and improves installation efficiency and accuracy.

The at least one main arm 81 is connected with the annular part 61 through at least one flexible gasket 9.

In practice, the at least one flexible gasket 9 is made of various materials, such as rubber (natural rubber, styrene-butadiene rubber, silicone rubber, etc.), foam (polyurethane foam, polyethylene foam, etc.), fiber (non-asbestos fiber, carbon fiber, glass fiber, etc.), soft metal (such as copper and aluminum) or composite materials (such as metal and rubber, fiber and foam, etc.).

As cushioning materials, the at least one flexible gasket 9 can effectively absorb and reduce the force caused by vibration or impact, and protect the connections between the at least one main arm 81 and the annular part 61 from damages; this damping effect is particularly important for prolonging the service life and maintaining the stability of the floodlight, especially in the environment with large vibration.

The at least one flexible gasket 9 can also reduce direct frictions between the at least one main arm 81 and the annular part 61, and reduce the possible wear during long-term use.

The at least one flexible gasket 9 can fill slight gaps between the at least one main arm 81 and the annular part 61 to a certain extent, and ensure closer connections; at the same time, deformation of the at least one flexible gasket 9 can increase contact area between the at least one main arm 81 and the annular part 61 and further improve the stability of connection components.

During operation of the floodlight, especially when adjusting angles or positions, the at least one flexible gasket 9 can effectively reduce noises caused by movements or mutual frictions between the components, so as to enhance mute sound effects during use and improve the user experience.

In addition, by selecting the materials of the at least one flexible gasket 9 with different hardness and thickness, damping effects during rotation can be finely adjusted, and an appropriate damping effect can prevent the at least one main arm 81 from rotating too fast or too slow, so as to ensure that the user can control rotation angles more accurately and realize accurate position fixing.

At least one through-hole is provided on an outer peripheral wall of the annular groove 45, and at least one limiting piece 7 extend into the annular groove 45 through the at least one through-hole; and parts of the at least one limiting piece 7 located in the annular groove 45 are formed as the at least one limiting part 71.

The design of directly installing the at least one limiting piece 7 through the at least one through-hole simplifies assembly process and makes the installation of the at least one limiting piece 7 more direct and efficient; In this way, it is convenient to quickly fix positions of the at least one limiting piece 7 during production and maintenance, and assembly efficiency is improved.

The at least one limiting piece 7 are designed to extend into the annular groove 45 through the at least one through-hole, which is convenient to adjust the positions and depths of the at least one limiting piece 7 as required to meet different installation and use requirements; and this adjustability enables the floodlight to be applied in various environments more flexibly.

When the at least one limiting piece 7 needs to be repaired or replaced, operation is more convenient due to the design of the at least one through-hole, and maintenance personnel can easily access and adjust or replace the at least one limiting piece 7 from outside without disassembling the whole floodlight, thus reducing maintenance cost and time.

At least one upright post 46 is arranged in the annular groove 45, and the at least one upright post 46 is arranged at extension of an axis of the at least one through-hole; and ends of the at least one limiting piece 7 located in the annular groove 45 are fixedly connected with the at least one upright post 46.

As a fixed point, the at least one upright post 46 enhances fixing effects of the at least one limiting piece 7 in the annular groove 45, avoid displacement or looseness of the at least one limiting piece 7 because of long-term use and under action of or external forces, and ensure reliability and durability of the product.

In the design of the floodlight of the present invention, the at least one upright post 46 not only fixes the at least one limiting piece 7, but also provides additional supports and limits for other components in the mounting groove 44, such as the lens 2, which can effectively reduce movements or deviations of the lens 2 caused by vibration or impact during use, ensure correct position and angles of the lens 2, and thus ensure the accurate projection and distribution of light.

There are many ways to fix the at least one limiting piece 7, such as interference fits between the at least one limiting piece 7 and the at least one through-hole, or threaded connections between the at least one limiting piece 7 and the at least one through-hole; specifically, an outer peripheral wall of the at least one limiting piece 7 is formed with at least one external thread; a peripheral wall of the at least one through-hole is provided with at least one internal thread, and the at least one external thread is in threaded connection with the at least one internal thread.

In addition, there are many ways to connect the at least one limiting piece 7 with the at least one upright post 46, such as the outer peripheral wall of the at least one limiting piece 7 is formed with at least one external thread; the at least one upright post 46 is provided with at least one threaded hole, and the external thread of the at least one limiting piece 7 is in threaded connection with the threaded part on the peripheral wall of the at least one threaded hole; and for another example, both the at least one limiting piece 7 and the at least one upright post 46 is provided with at least one magnetic attraction part and the at least one limiting piece 7 and the at least one upright post 46 are connected together by magnetic attraction.

In the above-mentioned embodiments, only part of the at least one limiting piece 7 contacting with the peripheral wall of the at least one through-hole and part of the at least one limiting piece 7 connected with the at least one upright post 46 can be provided with the at least one external thread; while, the part of the at least one limiting piece 7 between the at least one through-hole and the at least one upright post 46 are provided with smooth circular arc surfaces, so as to reduce frictions during clamping process with the at least one movable piece 8 and improve smoothness of the at least one limiting piece 7 moving on the at least one sub-arm 82.

The above are only the preferred embodiments of the present invention, which do not limit the protective scope of the present invention. Any equivalent structural transformations made by using the description and attached drawings of the present invention or direct/indirect applications in other related technical fields under the inventive concept of the present invention is comprised in the patent protection scope of the present invention.

The invention claimed is:

1. A floodlight, comprising:

a lamp board (1), which has a light emitting side (11) and a backlight side (12), and at least one mounting hole (131) is provided in the lamp board;

a lens (2), which is arranged on the light emitting side (11), and the lens (2) has a near light side portion (21) close to the lamp board (1), and at least one first connector (3) is provided on the near light side portion (21) corresponding to a position where the at least one mounting hole (131) is provided;

a radiator (4), which is arranged on the backlight side (12), and at least one second connector (5) is arranged on the radiator (4) corresponding to the position where the at least one mounting hole (131) is provided; and either of the at least one first connector (3) and the at least one second connector (5) extends through the at least one mounting hole (131) and is detachably connected with the other; and a frame (6), which is rotatably arranged on the radiator (4), and is rotatable against the radiator (4), and is rotatable to a fixed position and a dismounting position; when the frame (6) is in the fixed position, the frame (6) abuts against the lens (2), so the lens (2) moves in a direction close to the radiator (4); and when the frame (6) is in the dismounting position, the frame (6) is separated from the lens (2) to avoid the lens (2) being detached from the radiator (4).

2. The floodlight according to claim 1, wherein the lamp board (1) comprises a plate body (13) and a plurality of light emitting parts (14) arranged on the plate body (13), and the at least one mounting hole (131) is arranged in the plate body (13);

a plurality of light guiding parts (22) are provided on the near light side portion (21) corresponding to the plurality of light emitting parts (14) one by one; and a height of the at least one first connector (3) protruding from a surface of the near light side portion (21) is greater than a height of the light guiding parts (22) protruding from the surface of the near light side portion (21); and the at least one first connector (3) passes through the at least one mounting hole (131) and is connected with the at least one second connector (5) on the backlight side so to shorten distance between the light guiding parts (22) and the corresponding light emitting parts (14).

3. The floodlight according to claim 2, wherein the radiator (4) comprises a heat radiating side portion (41); the heat radiating side portion (41) abuts against the lamp board (1), and at least one avoidance groove (42) is arranged in the heat radiating side portion (41) at a position corresponding to the at least one mounting hole (131), and the at least one second connector (5) is arranged in the at least one avoidance groove (42).

4. The floodlight according to claim 3, wherein at least one first threaded hole is provided in a bottom wall of the at least one avoidance groove (42), and at least one second threaded hole is provided on the at least one second connector (5); the floodlight comprises at least one first fastener (43) and the at least one first fastener (43) is screwed into the at least one second threaded hole and the at least one first threaded hole respectively to fix the at least one second connector (5) in the at least one avoidance groove (42).

5. The floodlight according to claim 2, wherein a ventilation gap is formed in between part of the at least one first connector (3) located in the at least one mounting hole (131) and a peripheral wall of the at least one mounting hole (131).

6. The floodlight according to claim 1, wherein the at least one second connector (5) comprises two elastic arms (51) extending in parallel, and at least one clamping space (52) is formed in between the two elastic arms (51); and one of the two elastic arms (51) is movable in the direction away from the other elastic arm (51);

the at least one first connector (3) comprises at least one clamping part (321), and the at least one clamping part (321) extends into the corresponding at least one clamping space (52) and presses the two elastic arms (51).

7. The floodlight according to claim 6, wherein the elastic arms (51) comprise straight arms (511) and bending arms (512) which are connected together; each of the straight arms (511) is fixed on the radiator (4), and the two straight arms (511) and the two bending arms (512) extend in parallel; a minimum distance between the two bending arms (512) is smaller than a minimum distance between the two straight arms (511), and the minimum distance between the two bending arms (512) is smaller than a maximum width of the at least one clamping part (321).

8. The floodlight according to claim 6, the at least one first connector (3) comprises at least one column (31) fixed on the near light side portion and at least one second fastener (32); the at least one column (31) is provided with at least one third threaded hole; the at least one second fastener (32) is threadedly connected with the at least one third threaded hole; and at least part of the at least one second fastener (32) is exposed outside the at least one column (31) to form the at least one clamping part (321).

9. The floodlight according to claim 8, wherein an end face of the at least one second fastener (32) far away from the near light side portion (21) is set as at least one outward convex arc surface.

10. The floodlight according to claim 1, wherein the floodlight also comprises at least one limiting piece (7) and at least one movable piece (8); the at least one limiting piece (7) is arranged on the radiator (4), and the at least one movable piece (8) is movably arranged on the frame (6); when the frame (6) is in a fixed position, the at least one movable piece (8) is movably provided on the frame and is movable to a locked position and an unlocked position; when the at least one movable piece (8) is in the locked position, the at least one movable piece (8) is connected with the at least one limiting piece (7) to limit rotation of the frame (6) on the radiator (4); and when the at least one movable piece (8) is in the unlocked position, the at least one movable piece (8) is separated from the at least one limiting piece (7).

11. The floodlight according to claim 10, wherein the radiator (4) is formed with a mounting groove (44); both the lamp board (1) and the lens (2) are arranged in the mounting groove (44); the lamp board (1) abuts against a bottom wall of the mounting groove (44); and an annular groove (45) is formed between an outer peripheral wall of the lens (2) and a peripheral wall of the mounting groove (44);

the frame (6) comprises an annular part (61) and an abutment part (62) connected with the annular part (61); the annular part (61) is rotatably arranged on the radiator (4); when the frame (6) is in a fixed position, the annular part (61) moves into the annular groove (45), and the abutment part (62) moves to a side of the lens (2) facing away from the bottom wall of the mounting groove (44) and abuts against the lens (2); and the at least one limiting piece (7) comprises at least one limiting part (71) arranged in the annular groove (45); the at least one movable piece (8) is movably arranged in the annular part (61); and the at least one movable piece (8) is detachably connected with the at least one limiting part (71) in the annular groove (45).

12. The floodlight according to claim 11, wherein the at least one limiting part (71) is spaced from the bottom wall of the mounting groove (44); and the at least one movable piece (8) comprises at least one main arm (81) and at least one sub-arm (82), which are connected at an included angle; the at least one main arm (81) and the at least one sub-arm (82) enclose and form at least one assembly space (83); when the at least one movable piece (8) is in the locked position, the at least one limiting part (71) is clamped into the at least one assembly space (83), and either of the at least one main arm (81) and the at least one sub-arm (82) is located on side of the at least one limiting part (71) facing the bottom wall of the mounting groove (44), and another is located on the side of the at least one limiting part (71) facing away from the bottom wall of the mounting groove (44).

13. The floodlight according to claim 12, wherein the at least one main arm (81) is rotatably arranged in the annular part (61), and the at least one main arm (81) rotates to drive the at least one sub-arm (82) to move to the side of the at least one limiting part (71) facing the bottom wall of the mounting groove (44), or to drive the at least one sub-arm (82) to escape from the side of the at least one limiting part (71) facing the bottom wall of the mounting groove (44).

14. The floodlight according to claim 13, wherein an outer peripheral surface of the at least one limiting part (71) is arranged as at least one arc surface; and at least one concave arc surface (821) is formed at joints of the at least one main arm (81) and the at least one sub-arm (82), and the at least one limiting part (71) is clamped in the at least one space formed by the at least one concave arc surface (821); at least one guide inclined surface (822) is formed at a side of the at least one sub-arm (82) close to the at least one main arm (81), and one end of the at least one guide inclined surface (822) is connected with the at least one concave arc surface (821), and another end of the at least one guide inclined surface (821) extends obliquely in a direction away from the at least one main arm (81).

15. The floodlight according to claim 13, wherein the at least one main arm (81) is connected with the annular part (61) through at least one flexible gasket (9).

16. The floodlight according to claim 11, wherein at least one through-hole is provided on an outer peripheral wall of the annular groove (45), and at least one limiting piece (7) extends into the annular groove (45) through the at least one through-hole; and part of the at least one limiting piece (7) located in the annular groove (45) is formed as the at least one limiting part (71).

17. The floodlight according to claim 16, wherein at least one upright post (46) is arranged in the annular groove (45), and the at least one upright post (46) is arranged along an extension of an axis of the at least one through-hole; and one end of the at least one limiting piece (7) located in the annular groove (45) is fixedly connected with the at least one upright post (46).

18. The floodlight according to claim 17, wherein an outer peripheral wall of the at least one limiting piece (7) is formed with at least one external thread;

a peripheral wall of the at least one through-hole is provided with at least one internal thread, and the at least one external thread engages with the at least one internal thread; and at least one threaded hole is provided in the at least one upright post (46), and the at least one external thread of the at least one limiting piece (7) is in threaded connection with a threaded part on the at least one threaded hole.

* * * * *